(No Model.)
N. E. BENNETT.
CYCLE WHEEL.
No. 473,995. Patented May 3, 1892.
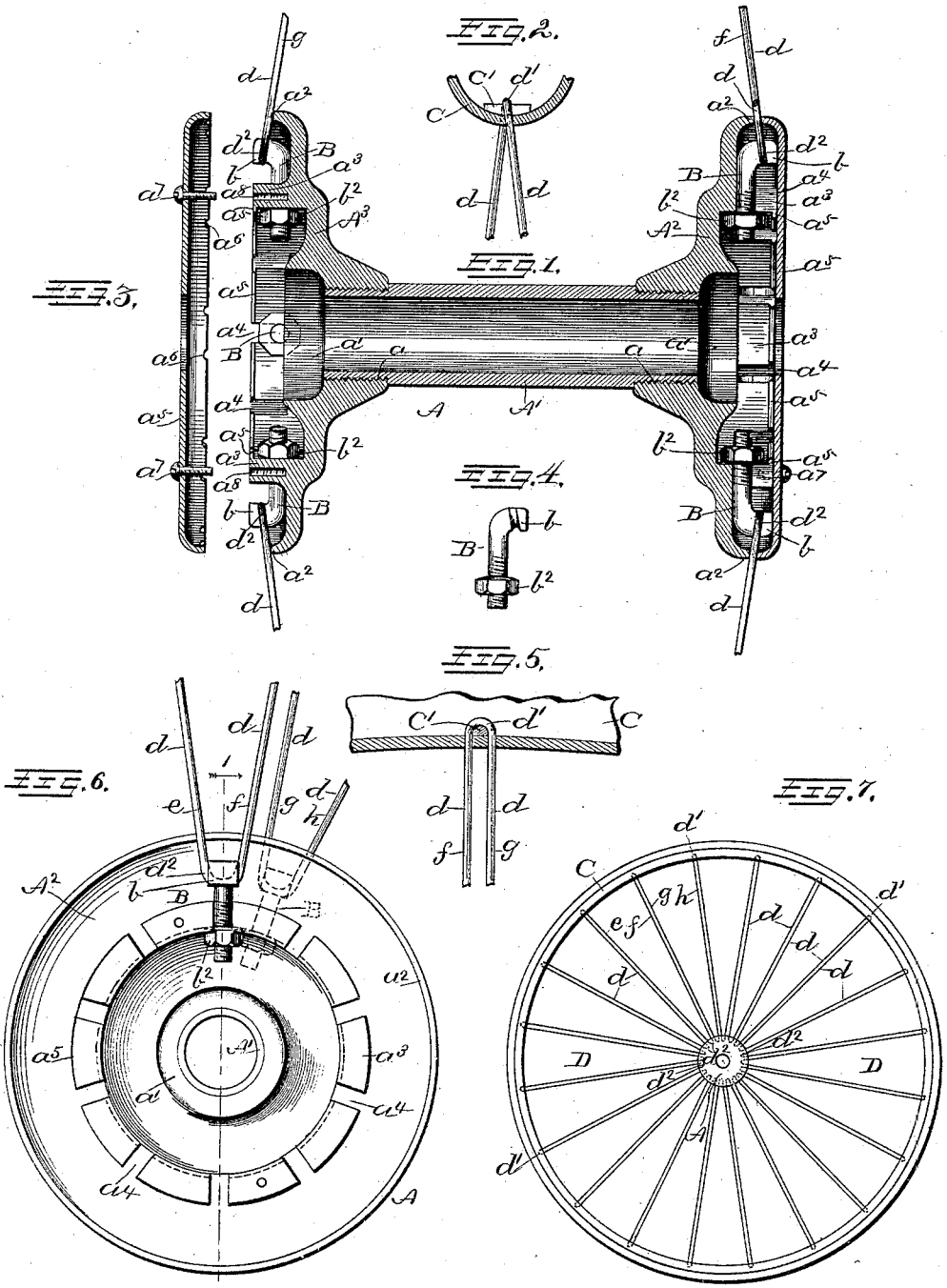

UNITED STATES PATENT OFFICE.

NOBLE E. BENNETT, OF BLOOMINGTON, ILLINOIS, ASSIGNOR TO THE BLOOMINGTON MANUFACTURING COMPANY, OF SAME PLACE.

CYCLE-WHEEL.

SPECIFICATION forming part of Letters Patent No. 473,995, dated May 3, 1892.

Application filed December 30, 1891. Serial No. 416,507. (No model.)

*To all whom it may concern:*

Be it known that I, NOBLE E. BENNETT, a citizen of the United States, residing at Bloomington, in the county of McLean and State of Illinois, have invented certain new and useful Improvements in Cycle-Wheels, of which the following is a specification.

My invention relates to improvements in cycle-wheels of that class or type in which a continuous wire is used to form the spokes or system of spokes of a suspension-wheel.

The main object of my invention is to furnish a wheel of the class above referred to in which efficient means are provided for tightening any pair of the series or system of connected spokes to produce an equilibrium in the tension of the entire series or system thereof, formed of a continuous wire, when from expansion by heat or stretching from any cause any of the spokes or parts become longer than the others, and thereby destroy the equilibrium of the system; and to the end of accomplishing this main object my improvement consists in a wheel having a system of spokes formed of a continuous wire, the connected inner ends of each pair of spokes of which are looped over or pass around hooks or bolts, which connect said ends with the hub, and which hooks or bolts are independently adjustable radially of the wheel for the purpose of adjusting the tension of any pair of the spokes to a certain extent independently of the others, and in order to equalize the tension of the spokes or the entire system of them in a wheel.

The novel means employed in carrying out this main object of my invention are hereinafter described and made the subject-matter of the claims hereto appended.

The preferred construction of parts and arrangement thereof are illustrated in the accompanying drawings, in which—

Figure 1 is a sectional elevation of the hub of a wheel embodying my improvements, with one of the hub-caps removed and showing parts of the spoke-wire, taken in line 1 1 in Fig. 6; Fig. 2, a sectional elevation transversely of a wheel-rim, showing one way of securing the spokes thereto; Fig. 3, a sectional elevation of a hub-cap; Fig. 4, an elevation of one of the hook-bolts for adjusting the tension of the spoke-wire; Fig. 5, a sectional elevation of the wheel-rim transversely of the section shown at Fig. 2; Fig. 6, an elevation of the hub seen from the right-hand side of Fig. 1, with the hub-cap removed; Fig. 7, a side elevation of one of my improved wheels.

The hub A, as shown, is formed of a tubular central part A', with a disk $A^2$ on one of its ends and a similar disk $A^3$ on its other end. I have found by experience that an efficient practical way to connect the tube A and disks A' $A^2$ is by screw-thread connection $a$, as shown at Fig. 1; but it will be evident that these parts may be integral or may be fixed to their connecting-tube A' in different ways.

As shown, the disks $A^2$ $A^3$ have each an annular race or track $a'$ for ball-bearings; but the tube A' may itself form the journal-bearing for the wheel; or any other suitable bearing may be used, as neither any special manner of connecting the disks and tube A' nor any specific wheel-bearing connected therewith enter into or constitute a part of my invention herein claimed, the full nature of which will hereinafter appear.

Each disk $A^2$ $A^3$ has an annular flange $a^2$, concentric with the axis of rotation of the wheel, projecting from the outer face of the disk at or near to its periphery, and each of said disks has also an annular flange $a^3$, concentric with, interior to, and on the same side of the disk as the flange $a^2$. The flange $a^3$ has slots $a^4$ radially therethrough, in which slots are seated the bolts B for adjusting the tension of the spokes and for fixing them as adjusted, as hereinafter described.

The spokes $d$ are formed of a continuous wire D, connecting the rim $c$ and disks $A^2$ $A^3$. Each part of the continuous wire extending from the rim to either of the disks is herein termed a "spoke." The wire D has bends or loops $d'$ between and connecting the ends of adjacent spokes $d$ at the rim of the wheel, and has bends or loops $d^2$ between and connecting the ends of adjacent spokes at the hub. As shown at Figs. 2 and 5, the outer ends of the spokes pass through the body of the rim C and are held from withdrawal therefrom by a cotter or key $c'$, which passes through each loop or bend $d'$; but in so far as my improvement is concerned the outer ends of the spokes may be connected with the rim, as shown, or may be connected therewith in any suitable way or manner which will not be a rigid connection and will be such connection as to permit of increased tension on one or two spokes, slightly affecting the tension of the adjacent spokes, whereby an equilibrium of tension throughout the system of spokes may be thoroughly established, and the specific means used in such connection of the spokes and rim does not enter into as a part of my invention herein claimed. The bolts B, as shown, are hook-bolts, or bolts with hook-heads $b$, and are seated loosely in the slots $a^4$ of the flange $a^3$ to permit of endwise movement of the bolts. The hook-heads of the bolts B are each engaged with the bend or loop $d^2$ between two adjacent spokes, and each bolt is screw-threaded and provided with a nut $b^2$, which extends across the slot $a^4$ and comes in contact with the flange $a^3$ at each side of the slot.

The disks $A^2$ $A^3$ are so disposed with reference to each other that each slot $a^4$ in the flange $a^3$ of either disk is opposite a median line between two slots of the other disk, or, in other words, are so disposed that the slots $a^4$ of the one disk alternate in radial positions with the slots $a^4$ of the other disk, as shown at Fig. 6 by the full-line hook-bolt in the disk $A^2$ and the dot-line hook-bolt in the disk $A^3$, and as also shown at Fig. 1. The disposition of the wire in the system of spokes is indicated by the order of the letters $e\ f\ g\ h$, used only as ordinal letters in the drawings, to indicate the order or succession of the spokes. The spoke indicated by the ordinal letter $e$ extends from the rim to a hook-bolt B of the disk $A^2$, (see Fig. 6,) and is there connected by the loop $d^2$ with the spoke indicated by the ordinal letter $f$, which extends to the rim, and is there connected by a loop $d'$ with the spoke indicated by the ordinal letter $g$, which extends to a hook-bolt B of the disk $A^3$, and is there connected by a loop $d^2$ with a spoke indicated by the letter $h$, which extends to the rim, is there bent to form a loop $d'$, and thence extends as another spoke to a hook-bolt of the disk $A^2$, and so on in succession to complete the system of spokes.

The spokes connected with each disk $A^2$ $A^3$ are properly aligned or retained in same plane at the periphery of each disk by reason of them all bearing against the flange $a^2$ of the disk with which they are connected, as shown at Fig. 1.

To prevent any tendency of the hook-bolts or tension-bolts to tilt backwardly and out of the slots $a^4$, especially when beginning to tighten up the nuts on said bolts, I prefer a flange $a^5$, projecting from the outer part of the flange $a^3$ toward the axis of the hub, and with which the nuts on the bolts B will come in contact to prevent such displacement of the bolts. If preferred, holes through the flange $a^3$ may be used instead of the slots $a^4$, as I do not desire to be restricted to the specific manner shown of fixing the bolts B to the flange $a^3$.

In a wheel of this class it is a most important factor to preserve an equilibrium in the tension of the system of spokes, or to have the tension equalized in all of the spokes and to have efficient means for such purpose. Should any of the spokes become expanded or lengthened from any cause, and thereby lose their tension and also injuriously affect the tension of the adjacent spokes, the proper tension may be quickly, easily, and efficiently re-established therein and in the adjacent spokes by simply turning the nut $b^2$ on the hook-bolt or tension-bolt B, which is directly connected with such spoke or spokes as have lost their proper tension. A cap $a^5$, fitted to the flange $a^2$ and provided with radial grooves $a^6$ for the spokes, covers the outer side of each disk and is fixed in place by set-bolts $a^7$, which pass therethrough and into screw-threaded holes $a^8$ in the flange $a^3$.

Having thus described my invention, what I claim as new, and desire to secure by Letters Patent, is—

1. In a wheel, in combination with a hub having a disk at each end thereof, with an annular flange on each disk, tension-bolts adjustably attached to said annular flange, and a wheel-rim, a system of spokes formed of a continuous wire, with a series of bends attached to the wheel-rim and another series of bends attached to said tension-adjusting bolts, whereby in adjusting the tension of any spoke or pair of spokes the tension of adjacent spokes will at the same time be adjusted to establish a proper equilibrium, substantially as described.

2. In a wheel, in combination with a hub having a disk $A^2$ $A^3$ on each end thereof, with an annular flange $a^3$ thereon having slots $a^4$, tension-bolts B, adjustably mounted in slots, and a wheel-rim, a continuous wire D, bent to form a system of connected spokes $d$, attached at one end to the wheel-rim and at their other ends to said tension-bolts, substantially as described.

3. In a wheel, in combination with a hub having a disk at each end thereof, with an annular flange on each disk, tension-bolts adjustably attached to said annular flanges in radial positions on each disk opposite a median line between said bolts on the other disk, and a wheel-rim, a system of spokes formed of a continuous wire, with a series of bends attached to the wheel-rim and another series of bends attached to said tension-adjusting bolts, whereby in adjusting the tension of any spoke or pair of spokes the tension of the adjacent spokes will at the same time be adjusted to establish a proper equilibrium, substantially as described.

4. In a wheel, in combination with a hub having a disk at each end thereof, with an outer annular flange for aligning the spokes in the same plane at each disk and an inner annular flange, to which tension-bolts are adjustably attached, and a wheel-rim, a system of spokes formed of a continuous wire attached at one end of each spoke to the wheel-rim and at their other ends to said tension-adjusting bolts, substantially as specified.

5. In a wheel, in combination with a hub having a disk at each end thereof, with an outer annular flange for aligning the spokes in the same plane at each disk and an inner annular flange having radial slots, as $a^4$, in which tension-bolts are adjustably seated, and having an inwardly-projecting flange $a^5$ to prevent tilting of said bolts, and a wheel-rim, a system of spokes formed of a continuous wire attached at one end of each spoke to the wheel-rim and at their other ends to said tension-adjusting bolts, substantially as specified.

6. In a wheel, in combination with a hub having a disk at each end thereof, with an outer flange $a^2$ and an inner flange $a^3$ on each disk, the inner flange of each disk having radial slots $a^4$ opposite a median line between the similar slots of the other disk, tension-bolts B, adjustably seated in said slots, and a wheel-rim, a continuous-wire system of spokes $d$, attached at one end of each spoke to the wheel rim and at their other ends to said tension-bolts, substantially as described.

In testimony whereof I affix my signature in presence of two witnesses.

NOBLE E. BENNETT.

Witnesses:
   HENRY D. SPENCER,
   CLARA LOWENTRAUT.